Figure 1:
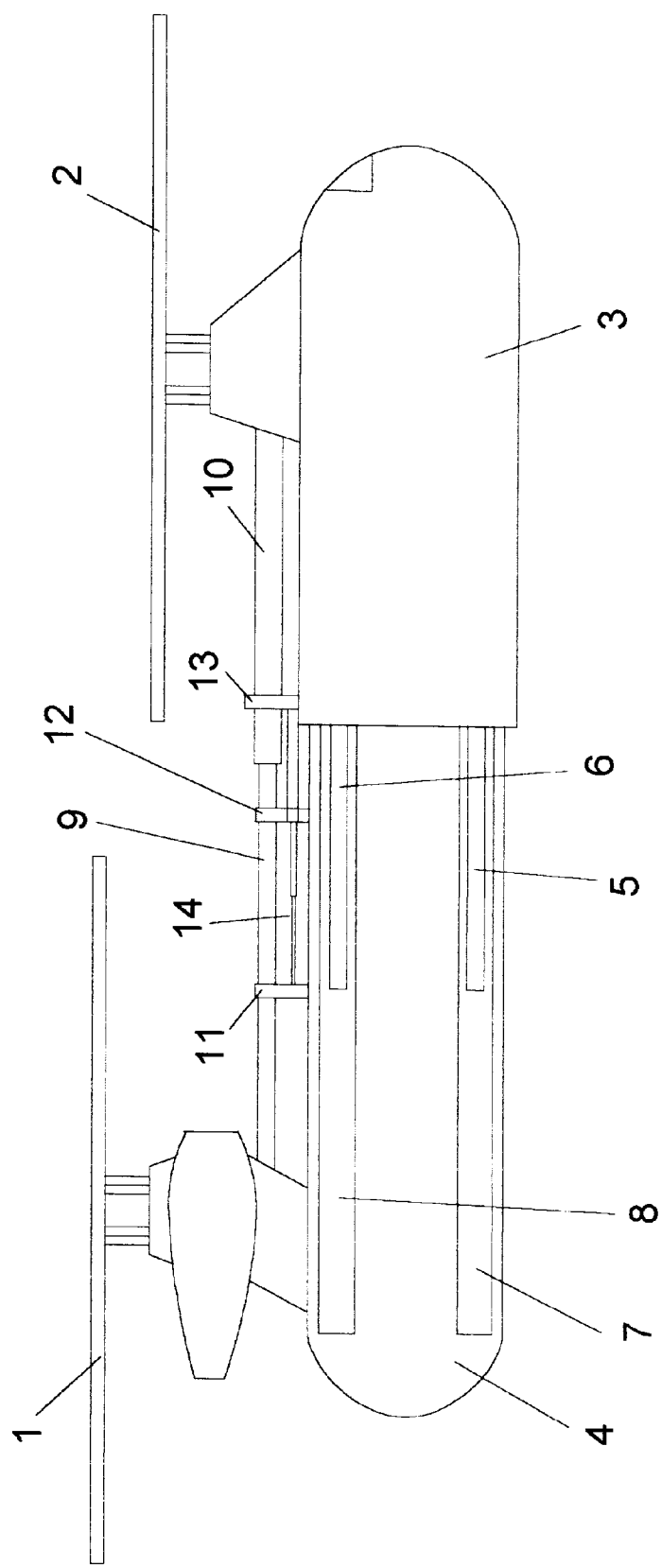

United States Patent
Kusic

[19]

[11] Patent Number: 6,164,590
[45] Date of Patent: Dec. 26, 2000

[54] VARIABLE BODY HELICOPTER WITH TANDEM LIFTING ROTORS

[76] Inventor: Tom Kusic, PO Box 932-G, GPO Melbourne, Vic, Australia, 3001

[21] Appl. No.: 09/217,128

[22] Filed: Dec. 21, 1998

[30] Foreign Application Priority Data

Dec. 22, 1997 [AU] Australia ........................ 1052

[51] Int. Cl.$^7$ ........................................ B64C 1/30
[52] U.S. Cl. ............................ 244/17.11; 244/120
[58] Field of Search ........................ 244/17.11, 120, 244/119, 117 R, 118.1, 118.2, 218

[56] References Cited

U.S. PATENT DOCUMENTS

| | | | |
|---|---|---|---|
| 2,294,003 | 8/1942 | Scheufele | 244/118.2 |
| 2,294,367 | 9/1942 | Fleming | 244/218 |
| 2,423,095 | 7/1947 | Gibson | 244/218 |
| 2,806,665 | 9/1957 | Gibson | 244/218 |
| 3,703,998 | 11/1972 | Girard | 244/120 |
| 4,562,979 | 1/1986 | Taylor | 244/159 |

FOREIGN PATENT DOCUMENTS 636653  5/1950  United Kingdom ............... 244/17.23

OTHER PUBLICATIONS

"The New Bell Copter" Aviation Week, PP21, Jun. 28, 1954.

*Primary Examiner*—Galen L. Barefoot

[57] ABSTRACT

A variable bodied helicopter is disclosed. The helicopter is of a type that has tandem lifting rotors (1, 2) with a body consisting of a front section (3) and a rear section (4). The rear section of the body is narrower than the front section of the body, thereby allowing the rear section to travel into the front section. Channelled railings (5, 6) attached to the front section of the body firmly hold the rear section through railings (7, 8) attached to the rear section. These railings guide the movement of the rear section relative to the front section. A shaft consisting of two sections (9, 10) is used to synchronize the tandem arranged rotors. The narrower section (9) of the shaft slides into the wider section (10) of the shaft when the rear section of the body moves into the front section of the body. Bearings (11, 12, 13) support the synchronizing shaft. One bearing (13) is firmly fixed to the front section (3) of the body while another bearing (12) is attached to the rear section (4) but is linked to the front section thus causing it to move against the rear section when the rear section moves relative to the front section. Another bearing (11) positioned on the rear section (4) is linked by a telescopic connection (14) to the front section of the body so that it is placed at the optimum position on the rear section as the body expands from a compressed state.

19 Claims, 2 Drawing Sheets

VARIABLE BODY HELICOPTER WITH TANDEM LIFTING ROTORS

This invention relates to the vertical take-off field of aviation.

Heavy lift helicopters with tandem lifting rotors have been in existence for many years. However, they have all been constructed in such a way that the body is rigid and robust to allow heavy lifting. This has meant that the internal area is of fixed size, irrespective of the weight of the cargo that is carried. For carrying a very heavy cargo, a short body is preferable to reduce the bending stress on the body between the two rotors. However, when transporting light but very bulky goods, a longer body would be preferable since a greater volume could be transported during each flight, within the structural limits of the longer body. The rigid construction of the bodies of helicopters with tandem lifting rotors has also meant that such helicopters could not be stored in confined areas that could not accommodate the lengths of their bodies. By being able to vary the lengths of their bodies, such helicopters could be stored in relatively more confined areas.

This invention overcomes the problem of having a fixed internal carrying area in a helicopter with tandem lifting rotors by allowing the total internal area of the main body of such a helicopter to be varied by having a body that can be lengthened and shortened without removing any sections of the body, that is, a body that is of variable length. To be able to vary the length of the body of the helicopter, the body is constructed from a plurality of sections that are able to move with respect to one another.

In one form of the invention the body of the helicopter consists of a front section and a rear section. In another form of the invention the body of the helicopter consists of a front section, a rear section, and a middle section, while yet in another form of the invention, the body of the helicopter consists of a front section, a rear section, and a plurality of middle sections. The body of the helicopter can be constructed so that chosen sections are able to move relative to one another.

In one form of the invention the length of the body of the said helicopter can be varied by moving the rear section of the said body relative to the front section of the said body.

In another form of the invention the length of the body of the said helicopter can be varied by moving the front section of the said body relative to the rear section of the said body.

In one form of the invention the length of the body of the said helicopter can be varied by moving a middle section of the said body relative to the front section of the said body.

In another form of the invention the length of the body of the said helicopter can be varied by moving a middle section of the said body relative to the rear section of the said body.

In another form of the invention the length of the body of the said helicopter can be varied by moving a middle section of the said body relative to another middle section of the said body.

In one form of the invention the length of the body of the said helicopter can be varied by using a plurality of telescopic assemblies to connect respective said sections of the said body, such that movement of the sections of the body would occur in line with the telescopic movement of the telescopic assemblies.

In another form of the invention the length of the body of the said helicopter can be varied by using a plurality of channelled railings to connect respective said sections of the said body, whereby longitudinal movement between railings in a controlled manner is able to occur. The railings of moveable sections that interconnect are able to guide the movement of the sections of the body while at the same time providing a firm joint between sections, thereby giving the body of the helicopter strength even though sections of the body are capable of moving.

A variety of channel shapes could be used for the channelled railings. The movement of sections of the body by use of the chanelled railings can be compared to some extent to sliding side doors on transport vans, where railings are used to both firmly support the doors and guide the movement of the doors during opening and closing of the doors.

The use of the channelled railings can also be used in conjunction with the telescopic assemblies to connect sections of the body while allowing controlled movement to occur.

In another form of the invention the rear section of the body of the said helicopter is able to move into and out of the front section of the said body, in a telescopic manner, such that the length of the said body can be varied through that movement.

In another form of the invention the front section of the body of the said helicopter is able to move into and out of the rear section of the said body, in a telescopic manner, such that the length of the said body can be varied through that movement.

In another form of the invention the middle section of the body of the said helicopter is able to move into and out of the front section of the said body, in a telescopic manner, such that the length of the said body can be varied through that movement.

In another form of the invention the middle section of the body of the said helicopter is able to move into and out of the rear section of the said body, in a telescopic manner, such that the length of the said body can be varied through that movement.

In one form of the invention the length of the body of the said helicopter can be varied using a plurality of telescopic assemblies to connect the front section of the said body to the rear section of the said body such that movement between the said sections is enabled.

In another form of the invention the length of the body of the said helicopter can be varied by using a plurality of channelled railings to connect the front section of the said body to the rear section of the said body, such that movement between the said sections is enabled.

In another form of the invention the length of the body of the said helicopter can be varied by using a combination of a plurality of telescopic assemblies and a plurality of channelled railings to connect the front section of the said body to the rear section of the said body, such that movement between the said sections is enabled.

In one form of the invention, hydraulic activated rods are used to move sections of the body relative to one another and to restrict movement when desired.

In another form of the invention movement of the sections of the body is controlled by use of rigid rods which can be fixed to sections of the body thereby preventing movement when the rods are attached, and by removing the rods, movement between sections of the body is allowed to occur.

In another form of the invention bolts are used to connect sections of the body, which can be removed to allow the sections to move, and following movement of the sections, are then attached to the sections of the body to restrict movement.

In one form of the invention the middle section of the body of the said helicopter is constructed with a hard substance, using a metal or a compound type material.

In another form of the invention the middle section of the body of the said helicopter is formed with a flexible substance such that the middle section of the said body can be compressed and expanded.

In one form of the invention the tandem lifting rotors are not synschronized.

In another form of the invention a shaft is used to synchronize the rotation of the tandem rotors.

In one form of the invention where a synschronizing shaft is used to synchronize the rotation of the tandem rotors, the length of the said synchronizing shaft is able to varied.

In one form of the invention the length of the said synchronizing shaft is able to be varied by using a telescopic sliding movement whereby a section of the said synchronizing shaft is splined externally, which splined section is able to slide into and out of an internally splined section of the said synchronizing shaft. An example of splining can be seen on car axles, which are of solid metal but splined externally, and fit into splined differential attachments.

In another form of the invention the said synchronizing shaft is constructed so that a section of the said synchronizing shaft can be removed.

In one form of the invention a plurality of bearings are used to support the rotor synchronizing shaft.

In one form of the invention a bearing that is used to support the said synschronizing shaft is able to be moved to a greater or lesser distance from another bearing that supports the said synchronizing shaft.

In another form of the invention a plurality of bearings that are used to support the said synchronizing shaft are able to be moved to a greater or lesser distance from other bearings that support the said synchronizing shaft.

The movement of the bearings in the invention is achieved by using a chanelled railing to guide the movement of the moveable bearings, and to provide support for the moveable bearings. The use of the chanelled railings allows the moveable bearings to be supported from many angles, while at the same time permitting longitudinal travel. In order to ensure that the moveable bearings are situated at optimum locations on the body of the helicopter, telescopic links are used to connect the moveable bearings to sections of the body. The telescopic links allow longitudinal movement to occur, to the extent of the telescopic extension during expansion of the body of the helicopter, and during contraction of the body, the telescopic links in their compressed form can also provide a stopping point for the bearings. Without the use of moveable bearings, and the proper positioning of such bearings, the synchronizing shaft may be left without adequate support, possibly resulting in dangerous vibration of the shaft.

IN THE DRAWINGS

Figure 2:
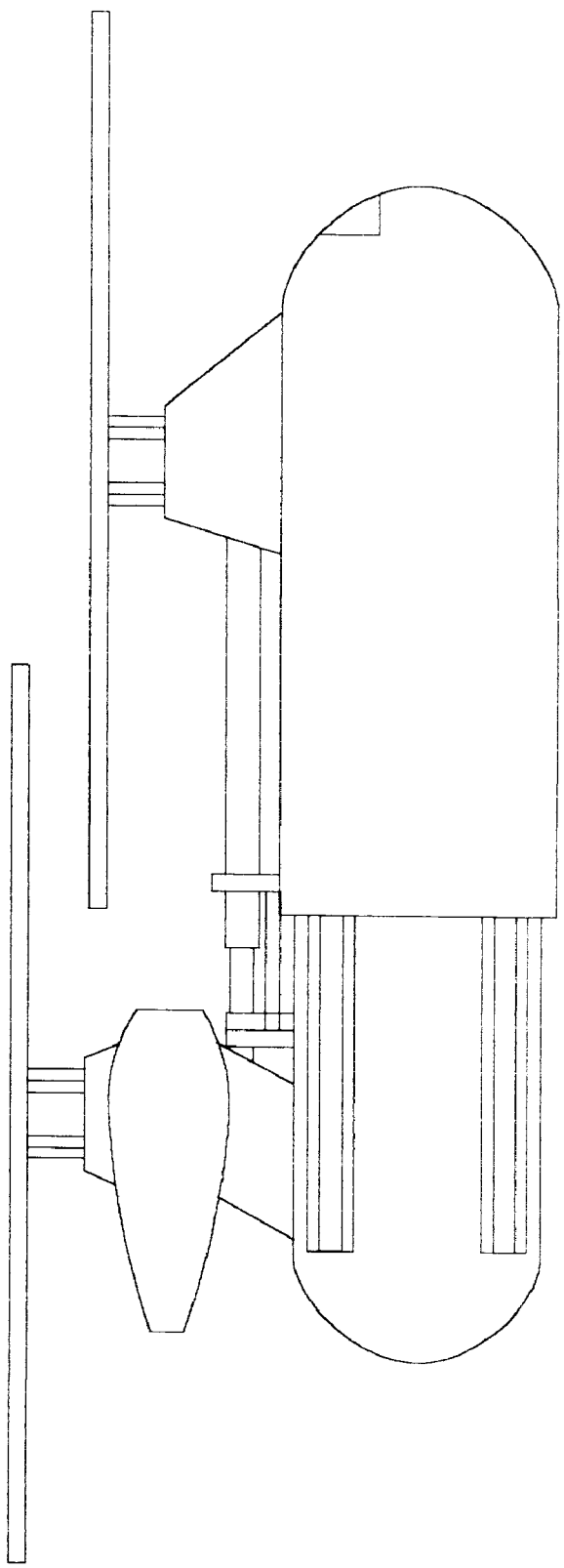

FIG. 1 shows the side view of a helicopter with tandem lifting rotors 1 and 2 and a body consisting of two sections, with the rear section 4 of the body narrower than the front 3 section of the body. The sections of body of the helicopter shown in FIG. 1 are designed to allow the rear section 4 to travel into the front section 3 of the body in a telescopic manner, with chanelled railings 5 and 6 on the front section used to link the two sections by means of the channelled railings 7 and 8 on the rear section 4. FIG. 1 also shows a shaft that synchronizes the tandem rotors. The shaft is shown as being composed of two sections, a narrow section 9 and a wide section 10, with the narrow section 9 being able to travel into the wider section 10 of the shaft in a telescopic manner when the body is compressed. Bearings 11, 12, and 13 supporting the synchronizing shaft show how bearings can be located on the body of the helicopter to allow movement of the bearings, with a telescopic link 14 controlling the movement of bearing 11. FIG. 2 shows the same helicopter with the body in a compressed state where a large area of the rear section has moved into the front section.

The claims defining this invention are as follows:

1. A helicopter, being a helicopter with tandem lifting rotors and a body that consists of a plurality of sections, which said body can be varied in length such that the internal area of the said body can be varied without adding sections to the said body, or removing sections of the said body from the said body, with sections of the said body connected by a plurality of channelled railings such that sections of the said body connected by the channelled railings are able to move relative to one another, and through that movement alter the length of the said body, with a shaft used to synchronize the rotation of the said tandem lifting rotors, which said shaft consists of a plurality of sections, such that the length of the said shaft is able to be varied by using a telescopic sliding movement, whereby a section of the said shaft is splined externally, which said externally splined section of the said shaft is able to slide into and out of an internally splined section of the said shaft.

2. A helicopter, being a helicopter with tandem lifting rotors and a body that consists of a plurality of sections, with sections of the said body able to move relative to one another in such a manner that the internal area of the said body and the length of the said body can be varied by such movement and which said body of the said helicopter consists of a front section and a rear section, and the said rear section of the said body of the said helicopter is able to move into and out of the front section of the said body, in a telescopic manner, such that the length of the said body can be varied, with a shaft used to synchronize the rotation of the said tandem lifting rotors, which said shaft consists of a plurality of sections, such that the length of the said shaft is able to be varied by using a telescopic sliding movement whereby a section of the said shaft is splined externally, which said externally splined section of the said shaft is able to slide into and out of an internally splined section of the said shaft.

3. A helicopter, being a helicopter with tandem lifting rotors and a body that consists of a plurality of sections, with sections of the said body able to move relative to one another in such a manner that the internal area of the said body and the length of the said body can be varied by such movement, with a shaft used to synchronize the rotation of the said tandem lifting rotors, which said shaft consists of a plurality of sections, such that the length of the said shaft is able to be varied by using a telescopic sliding movement whereby a section of the said shaft is splined externally, which said externally splined section of the said shaft is able to slide into and out of an internally splined section of the said shaft.

4. The helicopter of any one of claims 1 to 3 wherein a plurality of bearings support the said shaft with respect to the said body.

5. The helicopter of any one of claims 1 to 3 wherein a plurality of bearings support the said shaft with respect to the said body and a bearing that is used to support the said shaft is able to be moved relative to another bearing that supports the said shaft.

6. The helicopter of any one of claims 1 to 3 wherein a plurality of bearings support the said shaft with respect to the said body and a bearing that is used to support the said shaft is able to be moved relative to another bearing that supports the said shaft, with a channelled railing rigidly joined to a section of the said body, which channelled railing is used to support the said moveable bearing, with the said moveable bearing being of such construction that a section of the moveable bearing is contoured to enable fitting of the contoured section of the moveable bearing into the said channelled railing such that when the contoured section of the moveable bearing is fitted into the channelled railing, movement of the said moveable bearing is directed longitudinally along the said channelled railing when sections of the said body move relative to one another.

7. The helicopter of claim 5, wherein a telescopic assembly which is of limited extendability is used to link the said moveable bearing to a section of the said body, thereby allowing the positioning of the moveable bearing to be controlled by the telescopic assembly, which telescopic assembly acts to restrict the movement of the moveable bearing longitudinally to the extent permitted by the limited movement of that telescopic assembly.

8. The helicopter of any one of claims 1 or 3 wherein a plurality of bearings support the said shaft with respect to the said body and a plurality of bearings that are used to support the said shaft are able to be moved relative to other bearings that support the said shaft.

9. The helicopter of any one of claims 1 or 3 wherein a plurality of bearings support the said shaft with respect to the said body, and a plurality of bearings that are used to support the said shaft are able to be moved relative to other bearings that support the said shaft, with a channelled railing rigidly joined to a section of the said body, which channelled railing is used to support the said moveable bearings, with the said moveable bearings being of such construction that a section of each moveable bearing is contoured to be able to fit into the channelled railing such that movement of the said moveable bearings is directed longitudinally along the said railing when sections of the said body move relative to one another.

10. The helicopter of claim 8 wherein a telescopic assembly which is of limited extendability is used to link the bearings to a section of the body, thereby allowing the positioning of the bearings to be controlled by the telescopic assembly, which assembly acts to restrict the movement of the bearings longitudinally to the extent permitted by the limited movement of said telescopic assembly and their respective links on the telescopic assembly.

11. The helicopter of any one of claims 1 to 3 wherein hydraulic activated rods are linked to sections of the said body and are used to control movement of sections of the said body relative to one another.

12. The helicopter of any one of claims 1 to 3, wherein rigid removable rods are used to control the movement of sections of the body relative to one another, which rods can be securely fixed to a plurality of sections of the body thereby rigidly linking the respective sections to which they are fixed.

13. The helicopter of any one of claims 1 to 3, wherein bolts connect sections of the body, which said bolts can be removed to allow the sections to move, and following movement of the sections, the said bolts can then be attached to the sections of the body to restrict movement.

14. The helicopter of claim 6, wherein a telescopic assembly which is of limited extendability is used to link the said moveable bearing to a section of the said body, thereby allowing the positioning of the moveable bearing to be controlled by the telescopic assembly, which telescopic assembly acts to restrict the movement of the moveable bearing longitudinally to the extent permitted by the limited movement of that telescopic assembly.

15. The helicopter of claim 9, wherein a telescopic assembly which is of limited extendability is used to link the bearings to a section of the said body, thereby allowing the positioning of the bearings to be controlled by the telescopic assembly, which assembly acts to restrict the movement of the bearings longitudinally to the extent permitted by the limited movement of said telescopic assembly and their respective links on the telescopic assembly.

16. The helicopter of claim 6, wherein a telescopic assembly which is of limited extendability is used to link the said moveable bearing to a section of the body, thereby allowing the positioning of the moveable bearing to be controlled by the telescopic assembly, which telescopic assembly acts to restrict the movement of the moveable bearing longitudinally to the extent permitted by the limited movement of that telescopic assembly and hydraulic activated rods are linked to sections of the said body and are used to control movement of sections of the said body relative to one another.

17. The helicopter of claim 6, wherein a telescopic assembly which is of limited extendability is used to link the said moveable bearing to a section of the body, thereby allowing the positioning of the moveable bearing to be controlled by the telescopic assembly, which telescopic assembly acts to restrict the movement of the moveable bearing longitudinally to the extent permitted by the limited movement of that telescopic assembly and rigid removable rods are used to control the movement of sections of the body relative to one another, which rods can be securely fixed to a plurality of sections of the body thereby rigidly linking the respective sections to which they are fixed.

18. The helicopter of claim 6, wherein a telescopic assembly which is of limited extendability is used to link the said moveable bearing to a section of the body, thereby allowing the positioning of the moveable bearing to be controlled by the telescopic assembly, which telescopic assembly acts to restrict the movement of the moveable bearing longitudinally to the extent permitted by the limited movement of that telescopic assembly and bolts connect sections of the body, which said bolts can be removed to allow the sections to move, and following movement of the sections, the said bolts can then be attached to the sections of the body to restrict movement.

19. A helicopter, being a helicopter with tandem lifting rotors and a body that consists of a plurality of sections, which said body can be varied in length such that the internal area of the said body can be varied without adding sections to the said body, or removing sections of the said body from the said body, and a shaft is used to synchronize the rotation of the said tandem lifting rotors, and which said shaft consists of a plurality of sections, such that the length of the said shaft can be shortened by removing a section of the said shaft or lengthened by the addition of a section to the said shaft such that the added section forms part of the said shaft, which said shaft is supported by a plurality of bearings with respect to the said body.

* * * * *